Dec. 28, 1954 P. E. HOVGARD 2,698,147
AIRCRAFT WITH FIXED WINGS AND LIFTING ROTOR
Filed Sept. 1, 1950 2 Sheets-Sheet 1

INVENTOR
Paul E Hovgard
BY
Harris L Campbell
ATTORNEY

Dec. 28, 1954 P. E. HOVGARD 2,698,147
AIRCRAFT WITH FIXED WINGS AND LIFTING ROTOR
Filed Sept. 1, 1950 2 Sheets-Sheet 2

INVENTOR
Paul E. Hovgard
BY
Harris S. Campbell
ATTORNEY

United States Patent Office 2,698,147
Patented Dec. 28, 1954

2,698,147

AIRCRAFT WITH FIXED WINGS AND LIFTING ROTOR

Paul E. Hovgard, Hagerstown, Md.

Application September 1, 1950, Serial No. 182,684

6 Claims. (Cl. 244—7)

This invention relates to aircraft which are equipped with rotors for hovering and slow speed flight operation and also with fixed wings which are used for support during high speed forward flight.

In aircraft of the type with which the present invention is concerned, there has been the problem of transferring the support from one form of flight supporting medium to the other. This problem has been particularly acute in aircraft in which a single lift or thrust unit is used to function actively under both hovering and high speed flight conditions. For example, machines have been proposed and tried which used an airfoil unit which rotated to provide a rotor for slow speed operation and which was to be stopped for use as a fixed wing for high speed. The conversion from one condition of operation to the other proved to be a critical operation and no practical solution has been developed. It has also been proposed to use large diameter propellers which are capable of acting as lifting rotors. These, together with the fixed wing, are rotated relative to the fuselage to a horizontal position in order to provide forward thrust. In this position the wing provides the required lift. With this system there is also a transition problem of transfer from rotor lift to wing support since the proper wing angle of attack is not available when the rotors become inclined at an angle too great for support of the craft.

With the arrangement of the present invention, the transfer problem has been greatly reduced inasmuch as two independent lifting devices are employed. The lifting rotor used for support at low speed is constructed in a fashion which provides for retaining the blades in position even when the rotor is operating at idling or no-load condition during high speed flight operations when the main lift is developed by the fixed wing. With this system transfer may be made gradually and without loss of altitude.

In aircraft of the type to which the present invention relates there is also the problem of transfer of power from one point of application to another depending upon the flight condition. With the present construction this transfer may be made in an extremely simple manner under the control of the operator merely by moving a single control member to which the pitch control of the lifting rotor and the pitch control of the propeller are connected in proper relationship.

A specific object of the present invention is the arrangement of the various structural and mechanical units of the aircraft in a fashion which provides for space in the aircraft adjacent the normal center of gravity position for the placing of disposable loads. With this arrangement there is only a small center of gravity range.

A further object of the present invention is to locate the rotating propeller for forward propulsion during high speed operation and the propeller for directional control during low speed operations at the rear portion of the aircraft remote from the occupant's cabin. This provides increased safety since the forward position of the craft is free from dangerous rotating members which might cause injury to passengers entering or leaving the aircraft.

Another object of the invention is the provision of power transmission mechanism in a fashion which allows continuous operation of the propulsive propeller with the power plant and allows continuous operation of the directional control rotor with the lifting rotor. This is accomplished by having the propeller connected for drive directly from the engine without any clutch disconnection and by having the tail rotor geared to the lifting rotor drive. An overrunning and disconnecting clutch is preferably placed between the engine propeller system and the rotor and tail rotor system.

A still further object of the invention is the provision of a simplified control system for operating the various controls, both for slow speed and for high speed flight. These improved controls are arranged to require a minimum of attention from the pilot and conform closely to the arrangement of controls for the normal helicopter type of aircraft.

How the foregoing objects and advantages are attained will be clear from the following description of the drawings in which—

Figure 1:
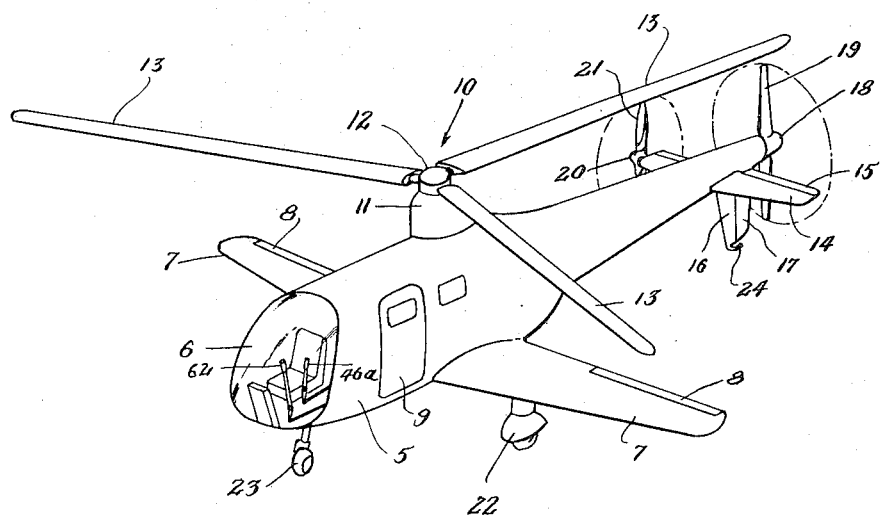
Figure 1 is a perspective view of an aircraft according to the present invention.

In Figure 1 it will be observed that the aircraft incorporates a fuselage 5 having an operator's compartment 6 in the forward end. Fixed wings 7 having ailerons 8 are attached to the fuselage at a longitudinal position which will place the center of pressure of the wing in proper relationship with the center of gravity of the aircraft. The door 9 in the fuselage 5 provides access to the occupant's compartment or the cargo section which is located close to the center of gravity of the aircraft. The lifting rotor 10 is connected to the fuselage 5 by means of suitable supporting structure 11, the center of the rotor being located generally in the region above the center of gravity to provide for proper relationship of the lifting action of the rotor with respect to the weight of the aircraft.

Rotor 10 incorporates a rotating hub member 12 and, in the form of craft illustrated, a plurality of blades 13 connected to the hub 12. The blades 13 are preferably attached to the hub by means of structure which provides for rigidity, at least in the vertical plane, to retain the relative position of each blade with respect to the rotor hub, even when the blades are rotating at low speed. At such times centrifugal force is insufficient to maintain a restraining action on the blades against incidental aerodynamic forces. The reason for this construction will become more evident as the description proceeds.

At the rear end of the fuselage an empennage is provided which includes horizontal stabilizer surfaces 14 equipped with elevators 15 and a vertical fin or stabilizer 16 with rudder 17. At the extreme rearward end of the fuselage a pusher type propeller 18 is supported. Propeller 18 is preferably of the controllable pitch type, the blades 19 being capable of having their pitch changed through a wide range.

On one of the stabilizer surfaces 14 a small rotor or propeller 20 having blades 21 mounted for pitch control, provides for directional control of the aircraft during low speed and hovering operation. The directional tail rotor produces a transverse thrust which also counteracts the torque reaction of the main rotor during its operation.

A landing gear comprising main wheels 22 and a forward nose-wheel 23 is provided for support of the aircraft on the ground. These wheels may be retracted during flight. A small tail skid 24 is also provided at the lower end of the downwardly extending vertical fin 16. Skid 24 contacts the ground in case of a tail-low landing and thus serves to protect the propeller 18 against accidental contact with the ground.

Figure 2:
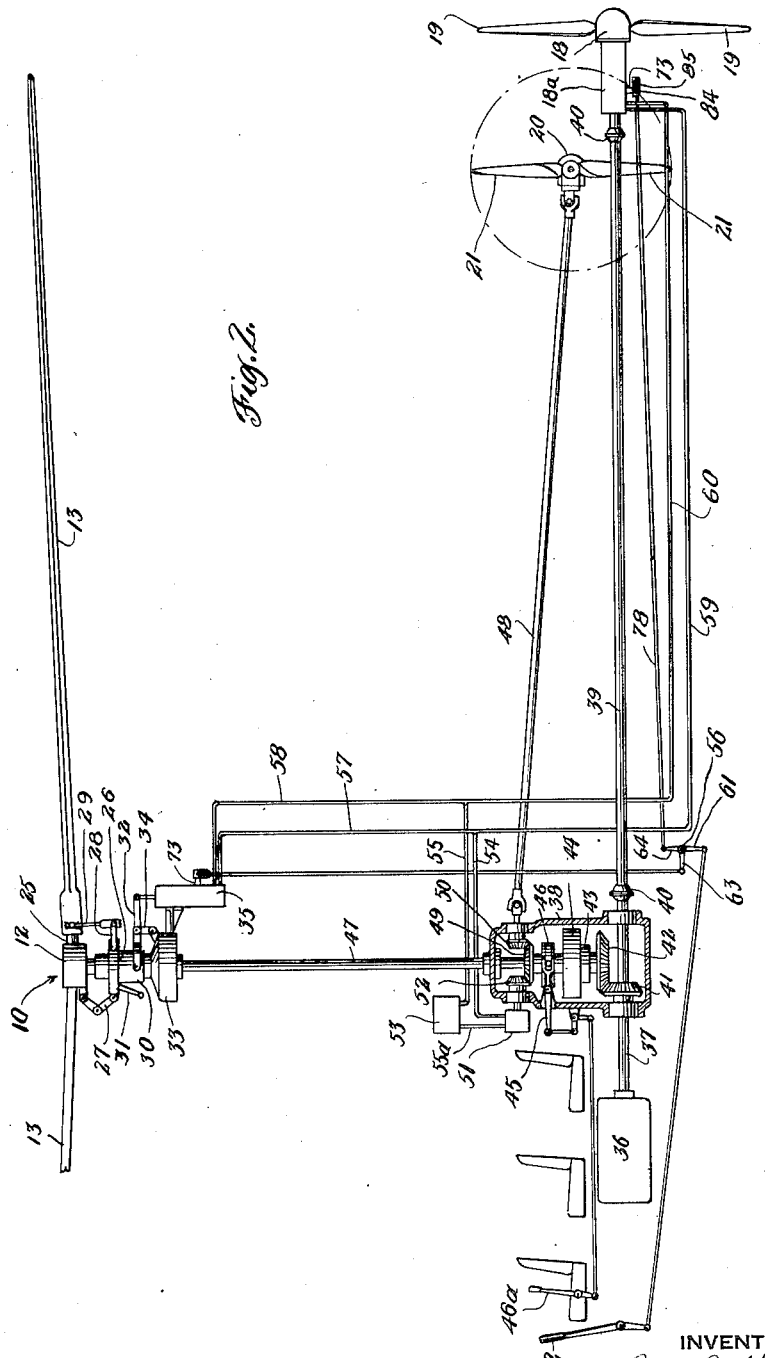
Figure 2 is a diagrammatic arrangement showing the transmission system and part of the control system.

Certain constructional and control features will be more clearly understood by reference to the diagrammatic arrangement shown in Figure 2. Here it will be seen that each rotor blade 13 is connected to the hub 12 by means of a fixed shaft 25. The blade 13 is supported on shaft 25 by means of suitable bearings which transmit the thrust and radial loads between the blade 13 and the hub 12. This provides for a rigid mounting of the blade to transmit the forces developed by centrifugal action and lift to the hub. It will be noted that the blade is attached to the hub at a fixed coning angle to reduce the bending moments developed, this angle providing for counteraction of the bending moments developed by the lift loads by the action of centrifugal force.

Mounting of the blades for pitch control permits variation in the amount of lift which may be carried by the rotor by changing the collective pitch of the rotor blades to meet the lift requirements for any particular condition of flight. For this purpose there is provided collective pitch control mechanism incorporating a swash plate member 26, which is mounted on suitable bearings and rotates with the hub 12 through the action of scissors linkage 27. An arm 28 and push rod 29 provide for transmission of swashplate motions to the blades to cause pitch control action. The swashplate unit 26 is supported on cylindrical sleeve 30 which may be raised or lowered to provide for collective pitch control of the blades. Cyclic control of blade pitch may also be accomplished through the swashplate mechanism by means of arms such as illustrated at 31 to cause tilting of the swashplate unit 26 with respect to the cylindrical support 30. The longitudinal and lateral controls of the aircraft are connected to the rotor in this fashion to provide for control of the aircraft at low speeds of flight.

To operate the collective pitch control of the rotor an arm 32 having a fork at one end for engaging the sleeve 30 is supported on the rotor hub base 33 by means of a link 34. Movement of arm 32 for operation of the collective pitch control is accomplished through the action of a hydraulic cylinder unit 35, which is also attached to the base 33.

The rear propulsive propeller 18 may also be controlled by means of hydraulic pressure, the control of propeller 18 and rotor 10 being preferably coordinated in a fashion which will be described.

The power for the drive of the main rotor and the pusher propeller is provided by engine 36 which is preferably located forwardly of the center of gravity of the craft. This engine may be of the flat or pancake type in order to be compact in the vertical direction so that it may be located underneath the cargo or occupant's space. A driveshaft 37 connects engine 36 with the transmission unit 38. Driveshaft 37 preferably extends directly through the transmission 38 and an extension shaft 39 transmits the power required to the rear end of the fuselage for driving propeller 18. Suitable universal joints 40 may be provided in the transmission shaft 39.

Bevel gears 41 and 42 transmit power from shaft 37 to a vertical shaft in the transmission unit 38 to which is attached an overrunning clutch unit 43 and an engageable clutch 44. Clutch 44 may be engaged and disengaged by means of a lever 45 which operates through thrust bearing 46. Thus, with the engine 36 running and clutch 44 engaged, the vertical output shaft 47 of the transmission unit is driven to apply power to the rotor 10. Suitable reduction gearing, which may be of a planetary type, may be housed in the base 33 of the rotor hub.

The drive to the directional tail rotor 20 is accomplished by means of the driveshaft 48 which is connected to the rotor driveshaft 47 by means of bevel gears 49 and 50 located in the transmission unit 38 at a point above the clutches 43 and 44.

In order to provide the hydraulic pressure for controlling the collective pitch of the main rotor 10 and the propulsive propeller 18, a pump 51 is mounted on the transmission unit 38 and driven by means of bevel gear 52. In this fashion pump 51 is driven whenever the rotor 10 is operating. A hydraulic reservoir 53 provides for storage of the oil required for operation of the hydraulic system. Hydraulic lines 54 and 55 connect the pump 51 and reservoir 52 to lines 57 and 58 leading to the main rotor pitch control and lines 59 and 60 extending to the rear propeller 18. A line 55a connects reservoir 53 with the pump 51. To control the hydraulic actuation of the rotor and propeller pitch, a bellcrank unit 56 is provided with an arm 61 which is connected to an operator's control 62. Bellcrank unit 56 incorporates arms 63 and 64 which are connected with the hydraulic unit 35 and the propeller unit 18a to permit actuation by means of a single control member of the collective pitch of the main rotor 10 and the blade pitch of the controllable propeller 18.

The control unit 56 actuates suitable valve mechanism in the rotor pitch control and the propeller pitch control to cause proportional increase of the pitch of the main rotor blades at the same time that decrease of the propeller pitch is taking place. Thus, the engine power may be directed either to the main rotor 10 or to the propulsive propeller 18 in any ratio desired. The pitch control system may, if desired, be arranged so that only the mid-region acts simultaneously with respect to the pitch of the propeller and the lifting rotor. For example, at the extreme forward range, say the forward quarter of the throw of lever 62, only the pitch of the propeller blades is changed. With this system, at the three-quarter forward position, the main rotor pitch has been reduced to "rotor idling" position and the propeller 18 pitch has been increased to low speed cruising pitch. Thus the forward quarter of the throw is devoted to adjusting propeller pitch for high speed flight conditions above the low cruising range.

Similarly, the rearward one-quarter of the movement of lever 62 may be reserved entirely for main rotor pitch control. Thus, at the rearward quarter position, the blade pitch of the propeller 18 will have been reduced to substantially no-thrust position and the pitch of main rotor blades 13 will have been increased to normal lifting pitch but less than full power pitch. The rear quarter of the lever throw, therefore, may be used for providing the exact pitch required for main rotor operation to take care of the particular low speed flight condition being used and to permit full power operation with maximum pitch for hovering and vertical landing or take-off purposes.

It will also be evident that the usual grip or motorcycle-type throttle control may be applied to the control member 62 to give the operator complete power control in the single lever. The selective operation above described may be accomplished by means of mechanism such as illustrated diagrammatically in Figure 3.

Figure 3:
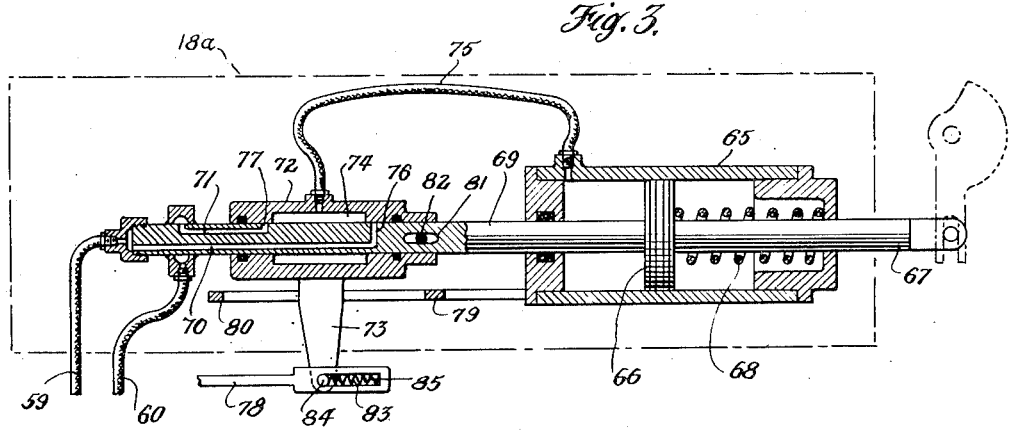
Figure 3 is a diagrammatic view of mechanism for actuating blade pitch.

In Figure 3 it will be seen that the hydraulic actuating unit for the propeller blades incorporates a cylinder 65 having a piston 66 connected to the blade actuating mechanism by means of rod 67. Spring 68 urges piston 66 in the direction to reduce propeller pitch, while hydraulic pressure is used to overcome the spring action and move the piston in the direction to increase blade pitch. A piston rod 69 extends from piston 66 to the exterior of the cylinder 65. Piston rod 69 is supplied with a hydraulic channel 70 which is connected to the pressure line 59 and a second hydraulic channel 71 which is connected with the hydraulic relief or return line 60. A valve device 72 surrounds a portion of the piston rod 69 and is equipped with an arm 73 which is rigidly connected to the valve unit 72. An inner chamber 74 is connected to the cylinder 65 by means of a flexible connection 75.

Port 76 which connects with the pressure channel 70 and port 77 which connects with the relief channel 71, are located in the piston rod 69 at positions where they are normally just beyond the ends of chamber 74. Thus, slight motion of the rod 78 will cause the arm 73 to slide the valve member 72 to a position where the port 76 opens into chamber 74. When this occurs through the action of the operator, pressure is introduced into the cylinder 65 and the piston moves until the port 76 reaches a position where it is no longer in registry with the chamber 74 and hydraulic pressure to the cylinder is closed off. Thus, power actuation of the cylinder occurs and its position will correspond to the position to which arm 73 is moved.

For reverse direction operation of the piston 66 the unit 72 is moved by means of arm 73 in the opposite direction to permit port 77 to register with the chamber 74. As a result, the force of spring 68 moves the piston 66 to the left and forces oil out of the cylinder through the return low pressure lines to a point where the port 77 is again covered and the return line is closed.

Stops 79 and 80 are provided to limit the extent of movement of the arm 73. In order to provide for proper continued relationship between the valve member 72 and the rod 69, a slot 81 extends through rod 69 and a bolt 82 extends through slot 81 into valve member 72. With this construction sufficient motion is provided to allow power actuation of the piston due to the relative movement of the valve member 72. However, in case of hydraulic failure it is still possible to actuate the mechanism manually by applying force to the arm 73 and transmitting it directly through medium of bolt 82 to the rod 69 to cause motion thereof.

If desired, the piston rod 67 may be connected to the blade through worm or cam mechanism to prevent reverse actuation of the mechanism due to forces developed at the blades.

Similar hydraulic mechanism may be used in conjunction with the rotor pitch control unit 35. Actuation of these units in the fashion described previously for providing a portion of the range at each end of the movement of lever 62 for actuation of either the rotor blades alone or the propeller blades alone, may be accomplished by means of mechanism such as illustrated for the connection of rod 78 to the arm 73. Here it will be seen that rod 78 is equipped with a slot 83 through which a pivot 84 extends. A spring device 85 normally holds the pivot 84 at one end of the slot as illustrated. This is the normal position of operation until the arm 73 reaches the forward stop 80 at which time motion in the cylinder 65 has reached its limit and further movement of the rod 78 compresses spring device 85. This permits continued actuation of the rotor hydraulic unit after the propeller unit has reached its limit. Similarly, the corresponding device at the rotor unit permits movement of arm 73 all the way to stop 79 even though the movement of the rotor piston has reached its limit a short time before arm 73 engages stop 79.

Operation of the aircraft incorporating the present invention is relatively simple and involves operation of the controls in a manner similar to the operation of helicopter controls during hovering, vertical flight and slow speed operations. During high speed flight the controls respond in a fashion similar to those of fixed wing aircraft. Thus, for operation in this combined fashion, the normal attitude controls are connected to both the helicopter and the fixed wing control system. The main control stick, besides being connected to the ailerons and elevators, is also connected to the rotor to provide cyclic pitch control. Also, the rudder pedals are connected to both the rudder 17 and the directional control rotor 20 to vary the blade pitch. This particular feature of the aircraft has not been shown since interconnection of rotary wing controls and fixed wing controls has previously been proposed.

For vertical take-off the clutch lever 46a is set in clutch-engaged position and the rotor 10 is brought up to flying speed with the blades 13 set at medium pitch. In this position the rotor 10 does not give sufficient lift to support the weight of the craft. Application of the wheel brakes prevents movement of the aircraft due to the small amount of thrust supplied by the propeller blades 19 under this condition. To take off, the lever 62 is moved rearwardly to increase the blade pitch of the main rotor 10 and decrease the pitch of the propeller blades 19. This brings the control into the region where the propeller pitch 18 has been reduced to zero and substantially full power is being applied to the rotor 13 when vertical take-off may be accomplished.

By manipulating the flight controls, forward speed may be initiated and, as the forward speed increases to an appreciable degree, the pitch of the rotor blades 13 may be reduced and the pitch of the propulsive propeller 18 increased by moving the lever 62 forwardly. This transfers some of the power from the main rotor 13 to the propulsive propeller 18 and with further speed increase, some of the lift is transferred from the rotor 13 to the fixed wings 7. By the time cruising speed is attained the transfer of power has been completed and the propeller 18 supplies the propulsion force. Also, the lift has been transferred to the fixed wings and the pitch of the main rotor blades 13 has been reduced to a point where the clutch 44 may be disengaged. The rotor 10 continues to rotate at slow speed under the influence of aerodynamic forces. Sufficient speed is maintained to operate pump 51. Under this condition, main rotor drag is reduced to a minimum. The rigid blade connections maintain the blades in proper relationship to the rotor hub during this mode of operation.

When it is desired to slow down and land, a reverse procedure to that described above is used. By engaging the clutch 44 the rotor is again brought up to speed and, as the forward speed of the aircraft is reduced, the lift and power are gradually transferred from the fixed wings and propulsive propeller to the main rotor 10 by the increase in pitch of the rotor blades 13 through the medium of the lever 62 and the distributing unit 56.

When slow speed has been established helicopter type of operation is used. The aircraft may then be operated in hovering flight or landed either vertically or at slow forward speed.

From the foregoing, it will be clear that I have provided a relatively simple aircraft which is capable of all speeds of flight from zero to maximum forward speed. This aircraft, while it may either hover on a lifting rotor or fly at high forward speeds on a fixed wing, does not have the problems normally associated with convertible type of aircraft which require change from one form to another for the different modes of flight. The use of the rigid type blades in the lifting rotor of the present invention permits an aircraft incorporating efficient lifting devices for both low speed and high speed operation in a single machine. By locating the engine forward of the center of gravity and the propulsive propeller at the rear, in combination with the hovering flight mechanism incorporating the transmission unit, the main rotor 10 and the directional rotor 20, an arrangement is provided which permits disposable loads to be located close to the center of gravity. The combination of the control of the main rotor pitch and the propulsive propeller pitch in a single operator's control simplifies the operation of the craft so that control is no more complicated than a normal helicopter. The relationship of the interconnected controls in the fashion disclosed, provides for individual control of the main rotor or the propulsive propeller at the extreme ranges of operation without introducing undesired operation of the unused unit at these extremes.

I claim:

1. For an aircraft having a main lifting rotor having a plurality of blades mounted for pitch change to provide for supporting the aircraft at low forward speeds and a fixed wing for supporting the aircraft at high forward speeds, a propulsive propeller having controllable pitch blades, an engine, a shaft connecting said engine and said propulsive propeller, a power drive from said engine to said rotor including clutch means for disconnecting the power from said rotor drive, a hydraulic pump connected to said power drive, mechanism for controlling the rotor blade pitch and mechanism for controlling the propeller blade pitch, hydraulic connections from said pump to said rotor blade pitch mechanism and from said pump to said propeller pitch mechanism, said rotor pitch mechanism and said propeller blade mechanism each having a hydraulic piston for actuating the blade pitch, a single control system for both mechanisms including a valve in the connection to each piston, said control system having connections to said valves to provide decrease in rotor blade pitch with increase of propeller blade pitch and vice versa.

2. For an aircraft having a main lifting rotor including a plurality of blades arranged for pitch change, a fixed wing capable of supporting said aircraft at high forward speeds, a directional propeller, an engine, a forward propulsive propeller having controllable pitch blades, a drive connection between said engine and said propulsive propeller, a drive system between said engine and said rotor including clutch means for disconnecting the power from said rotor drive, hydraulically controlled mechanism for the blade pitch of both said rotor and said propulsive propeller, a hydraulic pump connected to the rotor drive system, hydraulic connections from said pump to the hydraulic mechanism of the rotor and propulsive propeller, and a manual control having connections to the pitch change mechanism of both the lifting rotor and the propulsive propeller.

3. An aircraft having a fuselage, a fixed wing attached thereto, a lifting rotor and a directional propeller geared together for simultaneous operation either under power or under aerodynamic action, an engine and a forward propulsive propeller with permanent drive connections therebetween, a drive between said engine and said lifting rotor including a disengageable clutch, said lifting rotor having blades mounted for collective pitch change through a range capable of operating either aerodynamically or of absorbing full engine power, blade pitch mechanism for said propulsive propeller having a range to absorb full engine power or to provide zero thrust, a manual control member, interconnections between said control member and said rotor blades, interconnections between said control member and said propulsive propeller pitch mechanism, both of said interconnections being arranged to give increase of propeller blade pitch combined with simultaneous decrease of rotor blade pitch upon movement of said control member in one direction.

4. An aircraft having a fuselage, a main lifting rotor connected to said fuselage, said rotor including a plurality of blades arranged for pitch change, a directional propeller, an engine, a fixed wing mounted on said fuselage capable of supporting the aircraft at high forward speeds, a forward propulsive propeller having controllable pitch blades, said rotor and said directional propeller being mechanically connected together for simultaneous operation under either power or aerodynamic action, said engine and said propulsive propeller having permanent drive connections therebetween, drive connections between said engine and said rotor including a disconnectible clutch, the blades of said rotor having a pitch range capable of absorbing substantially full engine power or of operating under autorotational conditions, the blades of said propulsive propeller having a pitch range capable of absorbing substantially full engine power or of providing zero thrust, an operator's control having connections to cause actuation of the rotor blade pitch and connections to cause actuation of the propulsive propeller blade pitch in a sense to produce simultaneous increase of rotor pitch and decrease of propeller pitch upon movement of the operator's control in one direction.

5. An aircraft in accordance with the construction of claim 4 wherein said control connections include lost motion means, whereby the operator's control has a central range of movement in which the simultaneous variation of rotor and propeller pitch is accomplished, a range at one end of its travel where rotor pitch change only occurs and a range at the other end of its travel where propeller pitch change only occurs.

6. An aircraft having a fuselage, a main lifting rotor connected to said fuselage, said rotor including a plurality of blades arranged for pitch change, a directional propeller, an engine, a fixed wing mounted on said fuselago and capable of supporting the aircraft at high forward speeds, a forward propulsive propeller having controllable pitch blades, a pitch control power unit having connections to both said rotor and said propulsive propeller for pitch control, a transmission box unit having a horizontal shaft extending completely through the unit, said shaft being connected to said engine and said propulsive propeller, a vertical rotor drive shaft supported in said unit and connected to said rotor, a bevel gear drive between said horizontal shaft and said vertical shaft, a controllable clutch and an overrunning clutch in said vertical shaft, a bevel gear member attached to said vertical shaft above said clutches, a short horizontal shaft mounted in said unit having a bevel gear meshing with said bevel gear member and drivingly connected to said directional propeller, and a second short shaft mounted in said unit having another bevel gear meshing with said bevel gear member and drivingly connected to said pitch control power unit.

References Cited in the file of this patent

UNITED STATES PATENTS

| Number | Name | Date |
|---|---|---|
| 999,337 | Rebikoff | Aug. 1, 1911 |
| 1,160,021 | Watson | Nov. 9, 1915 |
| 2,317,340 | Bennett | Apr. 27, 1943 |
| 2,427,982 | Trotter | Sept. 23, 1947 |
| 2,464,285 | Andrews | Mar. 15, 1949 |

FOREIGN PATENTS

| Number | Country | Date |
|---|---|---|
| 2,046 | Great Britain | 1915 |